(12) United States Patent
Frye̊ et al.

(10) Patent No.: US 9,720,811 B2
(45) Date of Patent: Aug. 1, 2017

(54) UNIFIED MODEL FOR VISUAL COMPONENT TESTING

(75) Inventors: Lukáš Frye̊, Brno (CZ); Ondřej Skutka, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 487 days.

(21) Appl. No.: 13/172,367

(22) Filed: Jun. 29, 2011

(65) Prior Publication Data
US 2013/0007711 A1 Jan. 3, 2013

(51) Int. Cl.
*G06F 9/44* (2006.01)
*G06F 9/45* (2006.01)
*G06F 11/36* (2006.01)

(52) U.S. Cl.
CPC ...... *G06F 11/3672* (2013.01); *G06F 11/3612* (2013.01); *G06F 8/30* (2013.01); *G06F 11/3696* (2013.01)

(58) Field of Classification Search
CPC .. G06F 9/44; G06F 11/3696; G06F 11/36722; G06F 11/3688; G06F 11/3672; G06F 11/3684; G06F 11/3668; G06F 11/3664; G06F 17/2247; G06F 8/30; G06F 11/3612
See application file for complete search history.

(56) References Cited

U.S. PATENT DOCUMENTS

| 6,665,861 | B1 * | 12/2003 | Francis | G06F 8/60 717/120 |
| 7,222,265 | B1 * | 5/2007 | LeSuer | G06F 11/3414 714/38.1 |
| 7,451,391 | B1 * | 11/2008 | Coleman | G06F 17/2247 709/224 |
| 7,840,851 | B2 * | 11/2010 | Hayutin | G06F 11/368 714/46 |
| 7,849,447 | B1 * | 12/2010 | Karis | G06F 11/3664 714/100 |
| 8,051,372 | B1 * | 11/2011 | Sandhaus | 715/234 |
| 8,060,791 | B2 * | 11/2011 | Hayutin | G06F 11/368 714/46 |
| 8,065,410 | B1 * | 11/2011 | Breen et al. | 709/224 |
| 8,191,044 | B1 * | 5/2012 | Berlik | G06F 11/3672 717/102 |
| 8,332,818 | B1 * | 12/2012 | Haugh | G06F 11/3664 717/124 |

(Continued)

OTHER PUBLICATIONS

Fabrice Estievenart, Semi-Automated Extraction of Targeted Data from Web pages, 2006, pp. 1-10.*

(Continued)

*Primary Examiner* — Thuy Dao
*Assistant Examiner* — Mongbao Nguyen
(74) *Attorney, Agent, or Firm* — Lowenstein Sandler LLP

(57) ABSTRACT

A computing system receives user input of a root for a web application component in a HTML (hypertext markup language) tree structure for the web application component and receives user input of sub-elements for the web application component based on the location of the root for the web application component. The computing system generates a component model for the web application component based on the location of the root and the sub-elements and provides the component model to a test tool to enable the test tool to test the web application component.

12 Claims, 12 Drawing Sheets

(56) References Cited

U.S. PATENT DOCUMENTS

| | | | |
|---|---|---|---|
| 8,566,712 B1* | 10/2013 | Varian | 715/273 |
| 2004/0107415 A1* | 6/2004 | Melamed et al. | 717/124 |
| 2004/0194064 A1* | 9/2004 | Ranjan | G06F 11/3672 |
| | | | 717/124 |
| 2004/0205570 A1* | 10/2004 | Tonomura | G06F 17/30893 |
| | | | 715/234 |
| 2004/0215719 A1* | 10/2004 | Altshuler | 709/204 |
| 2008/0066009 A1* | 3/2008 | Gardner | G06F 8/34 |
| | | | 715/809 |
| 2008/0127094 A1* | 5/2008 | Squires et al. | 717/124 |
| 2008/0163077 A1* | 7/2008 | Lee | G06F 17/30967 |
| | | | 715/760 |
| 2009/0019313 A1* | 1/2009 | Pokala et al. | 714/37 |
| 2009/0037882 A1* | 2/2009 | Allen et al. | 717/125 |
| 2009/0100345 A1* | 4/2009 | Miller | G06F 11/3688 |
| | | | 715/738 |
| 2009/0133000 A1* | 5/2009 | Sweis et al. | 717/124 |
| 2010/0064281 A1* | 3/2010 | Kimball et al. | 717/124 |
| 2010/0095276 A1* | 4/2010 | Ottavi | G06F 11/3672 |
| | | | 717/125 |
| 2010/0281467 A1* | 11/2010 | Arteaga et al. | 717/126 |
| 2011/0078556 A1* | 3/2011 | Prasad | G06F 9/4443 |
| | | | 715/234 |
| 2011/0173589 A1* | 7/2011 | Guttman | G06F 17/30873 |
| | | | 717/125 |
| 2011/0246511 A1* | 10/2011 | Smith | G06Q 30/0255 |
| | | | 707/769 |
| 2012/0016862 A1* | 1/2012 | Rajan | G06F 11/3684 |
| | | | 707/710 |
| 2012/0110384 A1* | 5/2012 | Brunet et al. | 714/37 |
| 2012/0204091 A1* | 8/2012 | Sullivan et al. | 715/234 |

OTHER PUBLICATIONS

Rudy AG. Gultom, Implementing Web Data Extraction and Making Mashup with Xtractorz, 2010, pp. 1-9.*

Tali Garsiel, How Browsers Work: Behind the scenes of modern web browsers, 2011, pp. 6-59.*

Zehua Liu, A Visual Tool for Building Logical Data Models of Websites, 2002, pp. 1-4.*

* cited by examiner

UNIFIED MODEL FOR VISUAL COMPONENT TESTING

TECHNICAL FIELD

Embodiments of the present invention relate to testing web applications. Specifically, the embodiments of the present invention relate to a unified model for visual component testing.

BACKGROUND

Many software applications today are written as web-based applications to be run in an Internet browser. A web application can include web pages that have a number of user interface (UI) components. UI components can include rich components for user input and interaction. Examples of rich components can include auto-complete, calendar, file upload, list shuffle component, suggestion box component, etc. Web application Quality Assurance (QA) Engineers or test developers can use automated testing tools to test that the web-based application components are performing as expected. Examples of automated tools for testing web-based applications can include Selenium, HtmlUnit, HttpUnit, WebTest.

A user, such as a QA Engineer or test developer, can use an automated tool to develop test cases for testing a web application. Although a tool can automate the execution of testing the UI components of the web applications, a QA Engineer must manually define the tests to be executed. Often times, these tests previously have been defined and the code and test descriptions for these tests have already been written. From practice it may be seen that these tests are often written with no re-usability of code in mind. Blocks of test code are often manually duplicated across the test suites. There is not a current mechanism that allows QA Engineers to re-use the tests descriptions that have already been defined.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for providing a test model for testing a web application. A computing system receives user input of a root for a web application component in a HTML (hypertext markup language) tree structure for the web application component and receives user input of sub-elements for the web application component based on the location of the root for the web application component. The computing system generates a component model for the web application component based on the location of the root and the sub-elements and provides the component model to a test tool to enable the test tool to test the web application component. Conventional web application testing tools require a user, such as a test developer, to define each test to be executed. Embodiments of the present invention help users to efficiently develop tests by enabling users to re-use test descriptions of tests that have already been defined.

Figure 1:
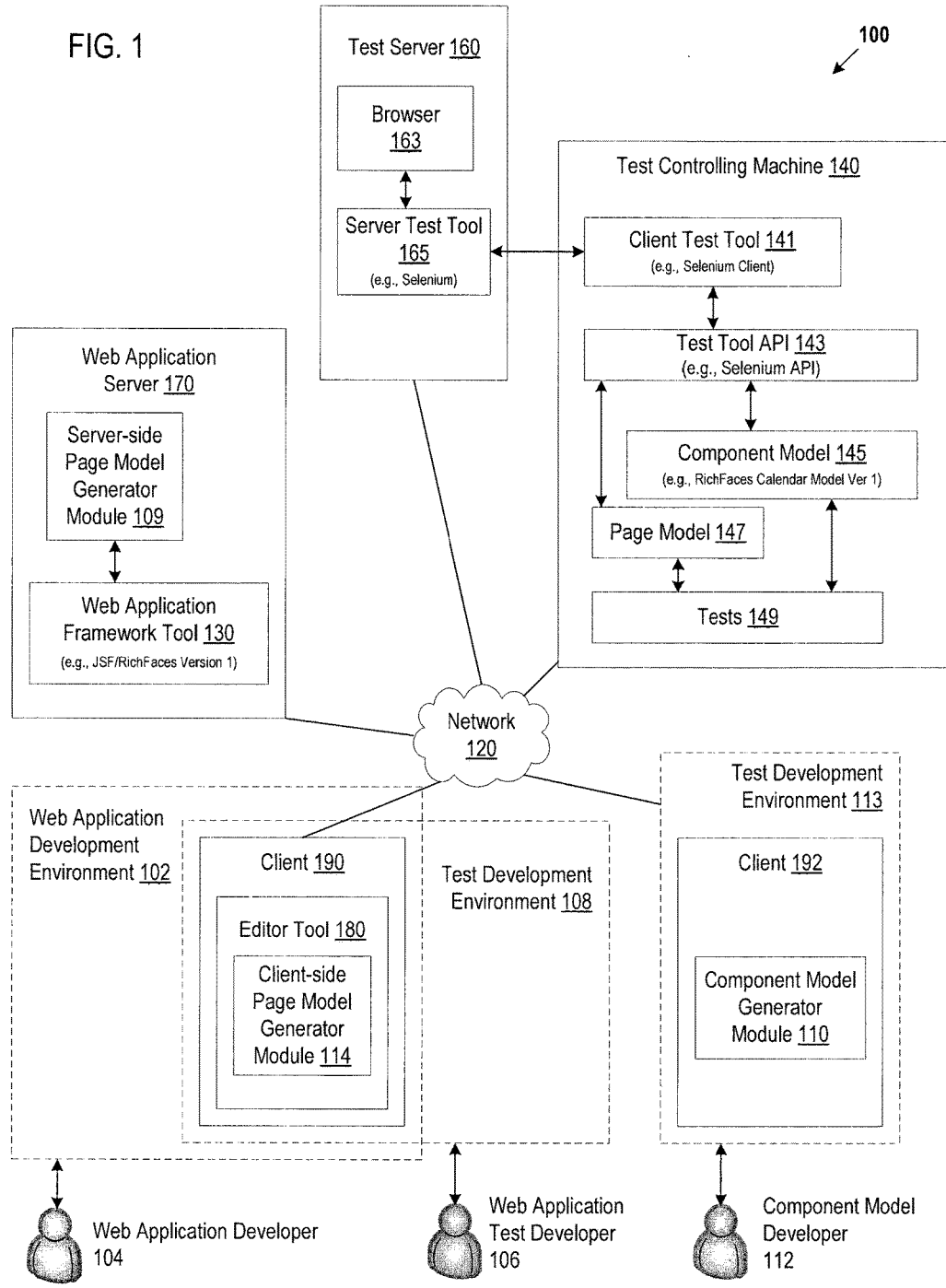
FIG. 1 is an exemplary network architecture in which embodiments of the present invention may operate.

FIG. 1 is an exemplary network architecture 100 in which embodiments of the present invention can be implemented. The network architecture 100 can include a web application development environment 102 and one or more test development environments 108,113, each having one or more clients 190,192 communicating via a network 120 to a web application server 170, a test server 160, and a test controlling machine 140. The network 120 can be a local area network (LAN), such as an intranet within a company, a wireless network, a mobile communications network, a wide area network (WAN), such as the Internet, or similar communication system. The network 120 can include any number of networking and computing devices such as wired and wireless devices.

A web application developer 104 can use a client 190 in a web application development environment 102 to communicate with a web application framework tool 130 hosted by a web application server 170 to develop web applications. A web application can include web pages that have a number of user interface (UI) components. UI components can include components for user input and interaction. Examples of components can include, and are not limited to, data table components, calendar components, list shuffle components, suggestion box components, auto-complete components, file upload components, etc. The web application framework tool 130 can provide a component library to a web application developer 104, such that the web application developer 104 does not need to write source code for a component when developing a web application. An example of a web application framework tool 130 is RichFaces, which is an open source Ajax enabled component library for Java Server Faces that provides rich components. A web application server 170 can be hosted by any type of computing device including server computers, gateway computers, desktop computers, laptop computers, hand-held computers or similar computing device. Client machines 190,192 can be hosted by any type of computing device including server computers, gateway computers, desktop computers, laptop computers, mobile communications devices, cell phones, smart phones, hand-held computers, or similar computing device. An exemplary computing device is described in greater detail below in conjunction with FIG. 12.

A web application test developer 106 can use a client 190 in a test development environment 108 to develop tests 149 that can be executed by a test controlling machine 140 for testing a web application, for example, that is developed by a web application developer 104. A web application test developer 106, such as a third party Quality Assurance (QA) Engineer, can create tests 149 that specify one or more UI components to be tested. A test 149 can test the existence of UI components in a web page, the design, the location, and the functionality of the web page, among other things. A test controlling machine 140 can be hosted by any type of computing device including server computers, gateway computers, desktop computers, laptop computers, hand-held computers or similar computing device. The tests 149 can test that the web application includes the components (e.g., calendar, data table, etc.) as intended and that the components are performing as expected. Typically, a web application test developer 106 manually searches the source code of a web application to locate parameters that are to be used to define and execute the tests 149. A component model developer 112 can use a client 192 in a test development environment 113 to create component models 145 that a web application test developer 106 can use in the test development environment 108, such that, the web application test developer 106 does not need to manually search the source code of a web application to locate the test parameters for the tests 149.

A client 192 can host a component model generator module 110 to receive user input from the component model developer 112 to generate the component models 145. In one embodiment, the roles of the web application test developer 106 and the component model developer 112 overlap and a web application developer 106 can provide user input to generate a component model 145. The component models 145 describe components as they are released by a web application framework tool developer. There can be a component model 145 for each web application component. For example, the web application framework tool 130 may be RichFaces Version 1, which provides 25 visual components (e.g., calendar, data table, etc.). The component model generator module 110 can generate a component model 145 for each component. For instance, there may be a RichFaces Calendar Model Version 1, a RichFaces Data Table Model Version 1, etc. When component models 145 are released by a component model developer 112, they can be installed on the test controlling machine 140.

The test controlling machine 140 can include a client test tool 141 to communicate with the component models 145 via a test tool API (application programming interface) 143. Examples of a client test tool 141 can include, and are not limited to, a Selenium client, a HtmlUnit client, a HttpUnit client, a WebTest client. The client test tool 141 can communicate with a server test tool 165 hosted by a test server 160 via the network 120. The server test tool 165 is an automated testing tool for testing web applications. Examples of a server test tool 165 can include, and are not limited to, Selenium, HtmlUnit, HttpUnit, WebTest. A test server 160 can be hosted by any type of computing device including server computers, gateway computers, desktop computers, laptop computers, hand-held computers or similar computing device. The client test tool 141 can pass test commands as specified by the tests 149 to the server test tool 165, which can then launch a browser 163, or similar application, to simulate user interaction with a web application to test the functionality of the web application based on the test commands from the tests 149.

A client 190 can include an editor tool 180 to allow a web application developer 104 to place components on a web page when developing a web application. In one embodiment, the editor tool 180 includes a client-side page model generator module 114 to generate a page model 147 of the web page at a time of creating the web page based on the components the web application developer 104 has placed in the particular web page. One embodiment of a method for generating a page model for a web page at the time the web page is created is described in greater detail below in conjunction with FIG. 7. The page model 147 can be installed on the test controlling machine 140, for example, by the web application test developer 106. The page model 147 points to the particular component model roots in a web page. The web application test developer 106 can use a page model 147 to write tests 149 for testing the functionality of a web page and existence of components in the web page. A web application test developer's 106 use of the page model 147 can help reduce the amount of time it takes in writing the test code for the tests 149 for testing a web page.

In another embodiment, a web application server 170 includes a server-side page model generator module 109 to generate a page model 147 of the web page at run-time of a web application. One embodiment of a method for generating a page model for a web page at run-time of a web application is described in greater detail below in conjunction with FIG. 10.

The client test tool 141 can communicate with one or more page models 147 via the test tool API 143. The client test tool 141 can use the client-side identifiers in the page model 147, which describes the components in the web page, to write and execute test code for testing, for example, the existence of the components in the web page.

Figure 2:
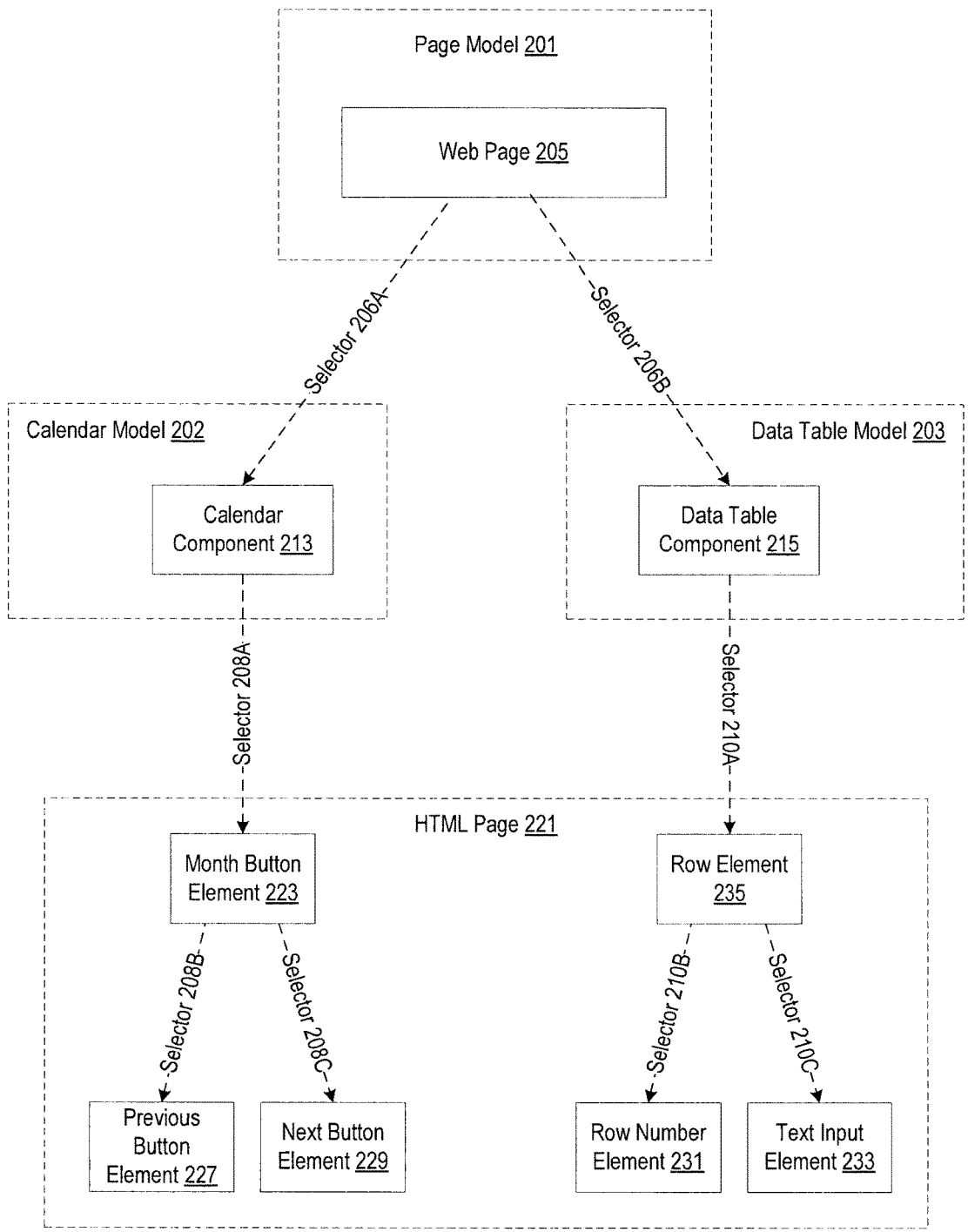
FIG. 2 is a block diagram of an exemplary page model and a component model for a web page.

FIG. 2 is a block diagram of three tiers of abstraction of an exemplary page model and exemplary component models for an exemplary web page. The three tiers include a page model tier, a component tier, and an HTML page tier. At the page model tier, a page model 201 for the web page 205 include selectors 206A,B which can be used by a testing tool, such as Selenium, to test, for example, that a calendar component 213 and a data table component 215 exist in the web page 205. The selector 206A may be a root location for the calendar component 213 in a HTML tree structure for the web page 205, and the selector 206B may be a root location for the data table component 215 in a HTML tree structure for the web page. The composition of a selector provides a locator for a given component/element/sub-element, which can be used by the testing tool.

The selectors 206A,B from the page model 201 to the components 213,215 can be derived from a user manually, can be provided by an application server at application at run-time, and can be derived from a visual editor tool at the time a web page is created. For example, the selectors 206A,B from the page model 201 to the components 213, 215 can be provided by a server-side page model generator module 109 in FIG. 1 at run-time of the web application and stored as part of a page model (e.g., page model 147 in FIG. 1). In another example, the selectors 206A,B from the page model 201 to the components 213,215 can be derived by a visual editor tool 180 in FIG. 1 when a web page is created and stored as part of a page model (e.g., page model 147 in FIG. 1). One embodiment of generating a page model from a visual editor tool when a web page is being created is described in greater detail below in conjunction with FIG. 7.

One embodiment of providing a page model at application run-time is described in greater detail below in conjunction with FIG. 10.

At the HTML page tier, each of the calendar component 213 and data table component 215 consists of one or more elements on an HTML page 221. For example, the calendar component 213 consists of a month button element 223 for selecting a month in the calendar component 213. The month button element 223 further consists of a previous button element 227 for selecting a previous month and a next button element 229 for selecting a next month. The data table component 215 consists of a row element 235, which further consists of a row number element 231 for numbering the rows, and a text input element 233 to receive text input for the rows.

At the component model tier, there is a component model for each component. There is a calendar model 202 that includes selectors 208A-C, which can be used by a testing tool (e.g., Selenium) to test that the calendar includes a month button, a previous button, and a next button, as well as to test the functionality of the buttons. The selectors 208A-C may be the paths from the root location of the calendar component 213 in a HTML tree structure to the location of the element (e.g., month button) and the sub-elements (e.g., previous button, next button) in the HTML tree structure. At the component model tier, there is also a data table model 203 that includes selectors 210A-C, which can be used by the testing tool (e.g., Selenium) to test that the data table includes rows, row numbers, and text fields, as well as to test the functionality of the row numbering and text input function. The selectors 210A-C may be the paths from the root location of the data table component 215 in a HTML tree structure to the location of the element (e.g., row) and the sub-elements (e.g., row number, row text) in the HTML tree structure.

Figure 3:
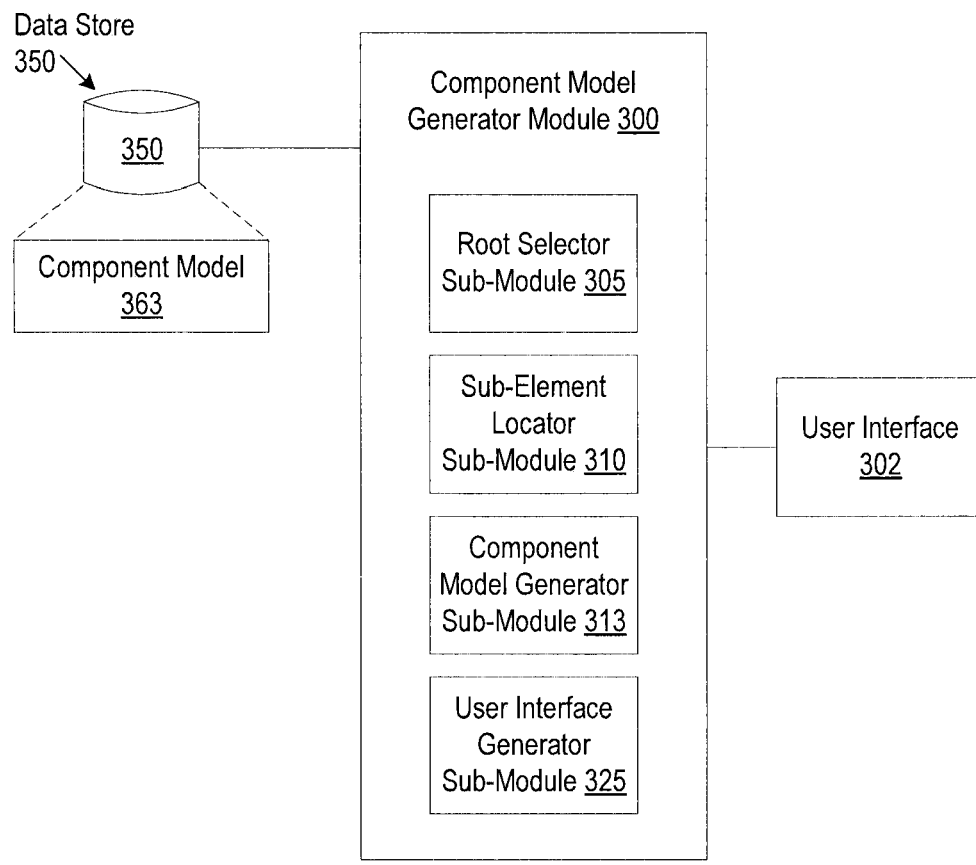
FIG. 3 is a block diagram of one embodiment of a component model generator module.

FIG. 3 is a block diagram of one embodiment of a component model generator module 300 for providing a component model for testing component elements of a web application. In one embodiment, the component model generator module 300 can be the same as the component model module 110 hosted by a framework server 145 of FIG. 1 and can include a root selector sub-module 305, a sub-element selector sub-module 305, a component model generator sub-module 313, and a user interface generator sub-module 325.

When a web application framework tool, such as Rich-Faces, is developed, HTML source code for the web application framework tool is created. The HTML source code can be represented as a HTML tree structure. The HTML tree structure can include root locations for the elements of the web components that are being provided by the web application framework tool. For example, RichFaces may provide 25 visual components (e.g., calendar, data table, etc.), which may be tested, and the HTML tree structure includes root locations for the elements of the 25 visual components. A user, such as a component model developer 112 and/or a web application test developer 106 in FIG. 1, can inspect a HTML tree structure for the web application components to locate the root locations for elements of the components.

The root selector sub-module 305 receives user input of a root location for an element of a web application component. The root selector sub-module 305 can receive the user input, via a user interface 302 that is coupled to the component model generator module 300. The user interface 302 can be a graphical user interface. The user interface generator sub-module 325 can generate the user interface 302. The root selector sub-module 305 uses the user input of the root locations of the elements in the HTML tree structure as selectors for a testing tool to use to test the elements of a web component. A testing tool, such as Selenium, uses the selector as a parameter in a test command when testing the component. For instance, RichFaces provides a login form component. The root selector sub-module 305 may receive user input for the root location of the login form in the HTML tree structure. The Selenium testing tool can use the root location of the login form as a parameter in a test command to test the login form.

The HTML tree structure can include locations of sub-elements for the elements of the web components. A user, such as a component model developer 112 and/or a web application test developer 106 in FIG. 1, can inspect the HTML tree structure for the sub-elements and identify the paths from the sub-elements to the root location. The sub-element selector sub-module 310 receives user input of the locations of any sub-elements for the components based on the location of the component root locations in the tree structure. The user input can include the paths from the component root to the sub-elements. The sub-element selector sub-module 310 can receive the user input, via the user interface 302. The sub-element selector sub-module 310 uses the user input of the locations of the sub-elements in the HTML tree sturcutre as selectors for a testing tool to use to test the sub-elements of a web component.

The component model generator sub-module 313 can generate a component model 363 for a component. The component model 363 can include the selectors, such as the location of the component root and the paths from the component root to the sub-elements. The component model 363 can be stored in the data store 350. The component model generator sub-module 313 can provide the component model 363, for example, to a client test tool (e.g., client test tool 141 in FIG. 1) to test the component. The component model generator sub-module 313 can release a version of component models 363 with a release of a corresponding version of a framework tool for the components. For example, the component model generator sub-module 313 releases a calendar model version 1 and a data table model version 1 to corresponds to a RichFaces Version 1 release that includes the calendar and data table components.

A data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
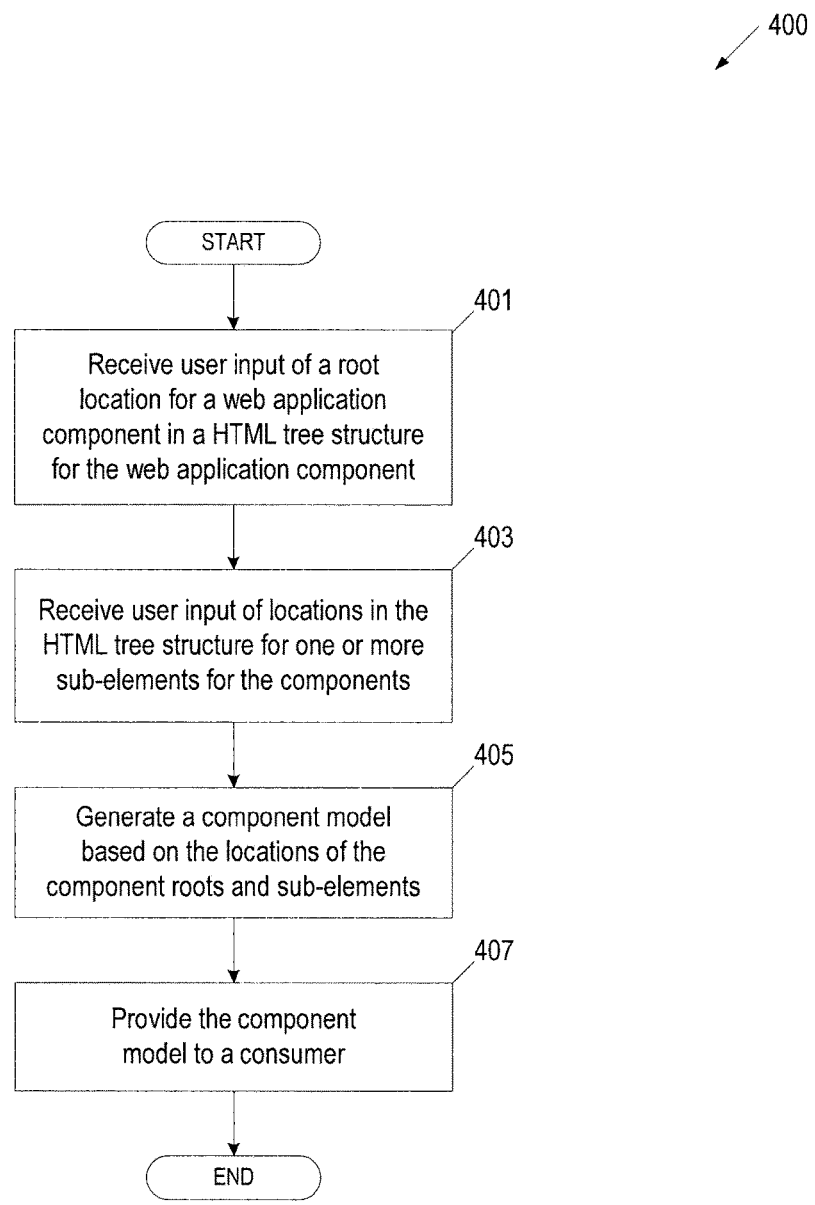
FIG. 4 is a flow diagram of an embodiment of a method for providing a component model.

FIG. 4 is a flow diagram of an embodiment of a method 400 for providing a component model. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the component model generator module 110 hosted by a client 192 of FIG. 1.

At block 401, the component model generator module receives user input of a root location for an element of a web application component in a HTML tree structure for the web application component. HTML source code for a web application framework tool, such as RichFaces, can be represented as a HTML tree structure that includes a root location for elements for each component, and paths from the component root element to sub-elements of the components, and paths from sub-elements to sub-elements of the sub-elements. At block 403, the component model generator module receives user input of one or more locations in the HTML tree structure for one or more sub-elements for the components. The user input can be the paths from the root location of the component to the sub-element locations.

At block 405, the component model generator module generates the component model from the path locations of the component roots and sub-elements for the components. The paths can be absolute paths and/or relative paths. For instance, a framework tool includes a form component and the component model generator module receives user input of an absolute path of the location of root element for the form component in the HTML structure, such as '/html/body/form'. In another example, the component model generator module receives user input of a relative path of the location of a text input field sub-element for the form component that is relative to the form root location. At block 407, the component model generator module provides the component model, for example, to a test tool and/or a user, such as a web application test developer, which can then use the component model to write the test code for testing the components. For example, the tests are written to tests that a calendar is functioning as expected. The component model can be released in parallel with a release of a component framework.

Figure 5:
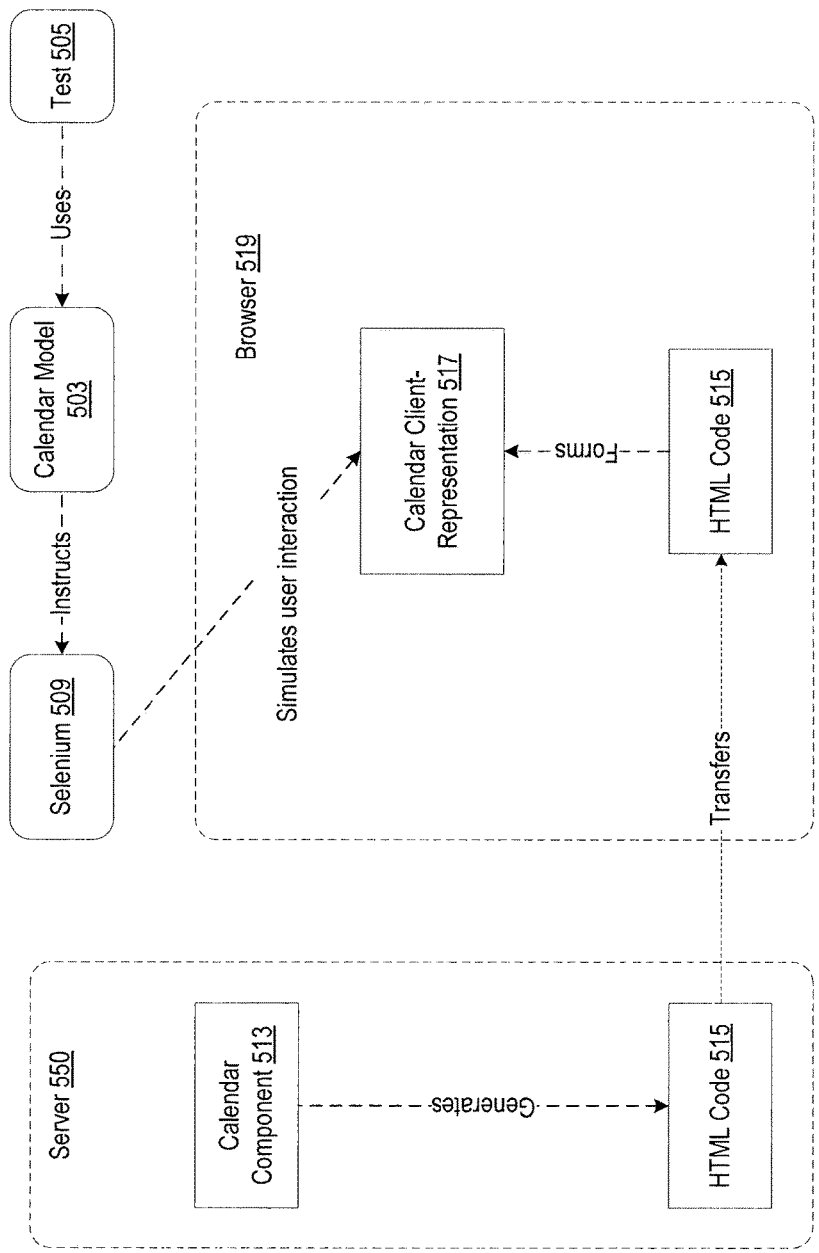
FIG. 5 is a block diagram of an exemplary use of a component model.

FIG. 5 is a block diagram of an exemplary use of a component model to test a web page component. A web application developer writes a web application hosted by a web application server 550. The web application includes one or more calendar components 513. The server 550 generates client-side HTML code 515 to represent the web page and transfers the client-side HTML code 515 to a browser 519, for example, hosted by a test server (e.g., test server 160 in FIG. 1) to form a calendar client-representation 517 of the calendar component 513. A test 505 for testing the web page uses a calendar model 503 for testing the calendar components in the web page. The calendar model 503 instructs a Selenium testing tool 509 to test the web page, for example, by providing selectors of the elements and sub-elements of a calendar component to the Selenium testing tool 509. The Selenium testing tool 509 uses the selectors provided by the calendar model 503 to simulate user interaction of the client-side representation of the calendar component 517. A test tool can use a calendar model 503, which includes the component root for a calendar and the paths from the component root to sub-element(s), to write the test code for testing the calendar components. For example, the tests are written to tests the 'year selection' button of the calendars, the 'month selection' button of the calendars, etc.

Figure 6:
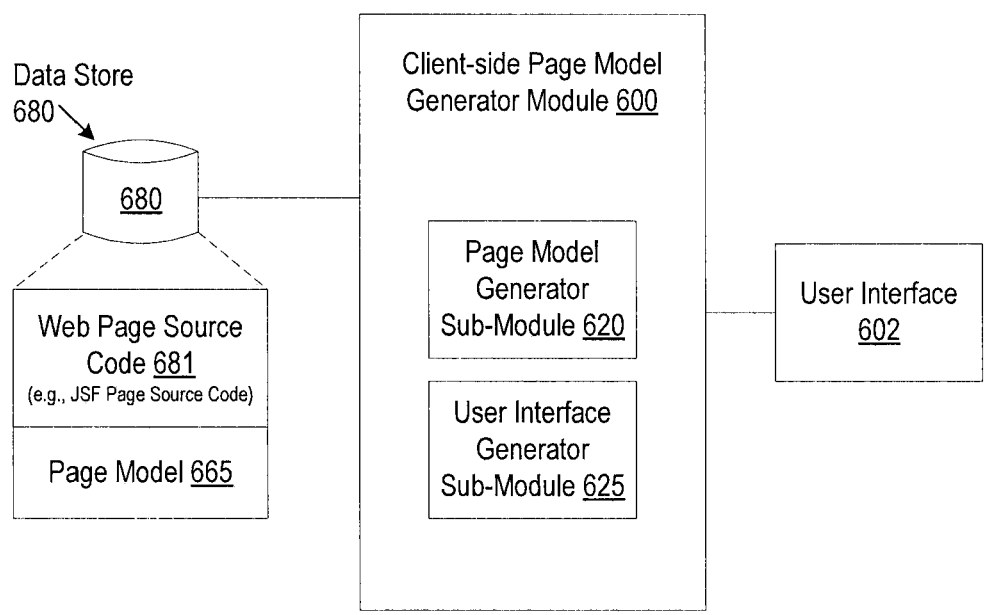
FIG. 6 is a block diagram of one embodiment of a client-side page model generator module.

FIG. 6 is a block diagram of one embodiment of a client-side page model generator module 600 for providing a page model at the time a web page is created. The client-side page model generator module 600 can be the same as the client-side page model generator module 114 hosted by a client 190 of FIG. 1. The client-side page model generator module 600 can include a page model generator sub-module 620 that creates a page model 665 from the visual perspective as described by an editor tool when the web page is being created. The client-side page model generator module 600 can be coupled to a data store 680 that stores web page source code 681 for a web page created by an editor tool in an intermediary format, such as JSF (Java Server Faces) page source code. The intermediary format web page source code 681 includes component identifiers for the components that are placed in a web page via the editing tool. The page model generator sub-module 620 can search the web page source code 681 and can use an algorithm to derive client-side identifiers from the component identifiers in the web page source code 681. The page model generator can generate a page model 665 that includes the client-side identifiers. The page model generator sub-module 620 can store the page model 665 in the data store 680. The page model generator sub-module 620 can provide the page model 665, for example, to a test tool (e.g., client test tool 141 in FIG. 1) and/or a test developer (e.g., web application test developer 106 in FIG. 1).

Figure 7:
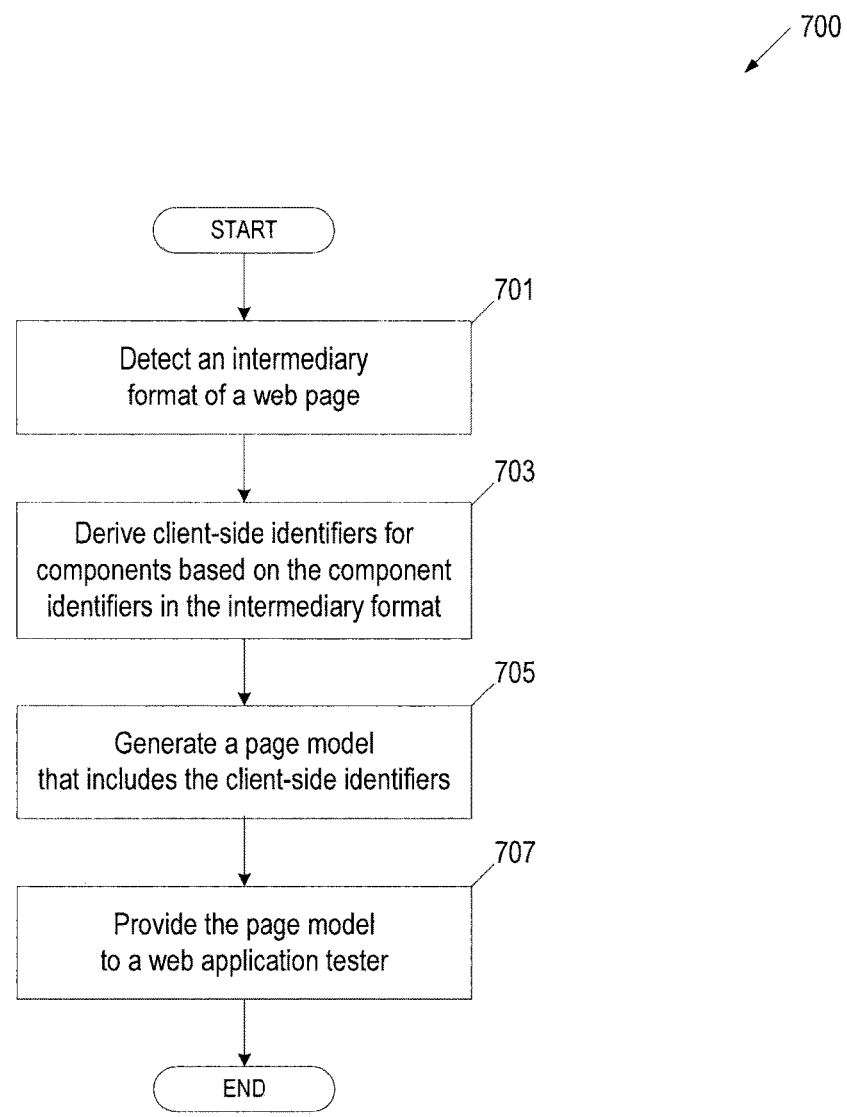
FIG. 7 is a flow diagram of an embodiment of a method for generating a page model at a time of creating the web page.

FIG. 7 is a flow diagram of an embodiment of a method 700 for generating a page model at a time of creating the web page. The page model includes selectors, such as selectors 206A,B in FIG. 2, that point to components in a web page. Returning to FIG. 7, method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the client-side page model generator module 114 hosted by a client 190 of FIG. 1.

At block 701, the client-side page model generator module detects an intermediary format of a web page, such as a JSF page, that is created by an editing tool. The JSF page includes component identifiers for the components that are placed in a web page via the editing tool. At block 703, the client-side page model generator module uses an algorithm to derive client-side identifiers from the component identifiers in the JSF page. At block 705, the client-side page model generator module generates a page model that includes the client-side identifiers and provides the page model at block 707, for example, to a test tool and/or a user, such as a web application test developer, which can then use the page model to write the test code for testing a web page. The page model includes the client-side identifiers of components to identify the components in a web page. For example, a web page includes two calendar components, images, text headings, etc. The page model includes the client-side identifiers of the calendars. A test tool can use the client-side identifiers in the page model, which describes the calendars in the web page, to write test code for testing the existence of the calendar components in the web page. For example, the tests are written to test at least two calendar exists somewhere in the web page. The tests can further test that each calendar is in an expected location.

The page model can include a component model, such as a calendar model for testing the calendar components in the web page. A test tool can use the calendar model to write the tests to test the functionality of the calendars themselves. For example, the tests are written to test the 'year selection' button of the calendars, the 'month selection' button of the calendars, etc.

Figure 8:
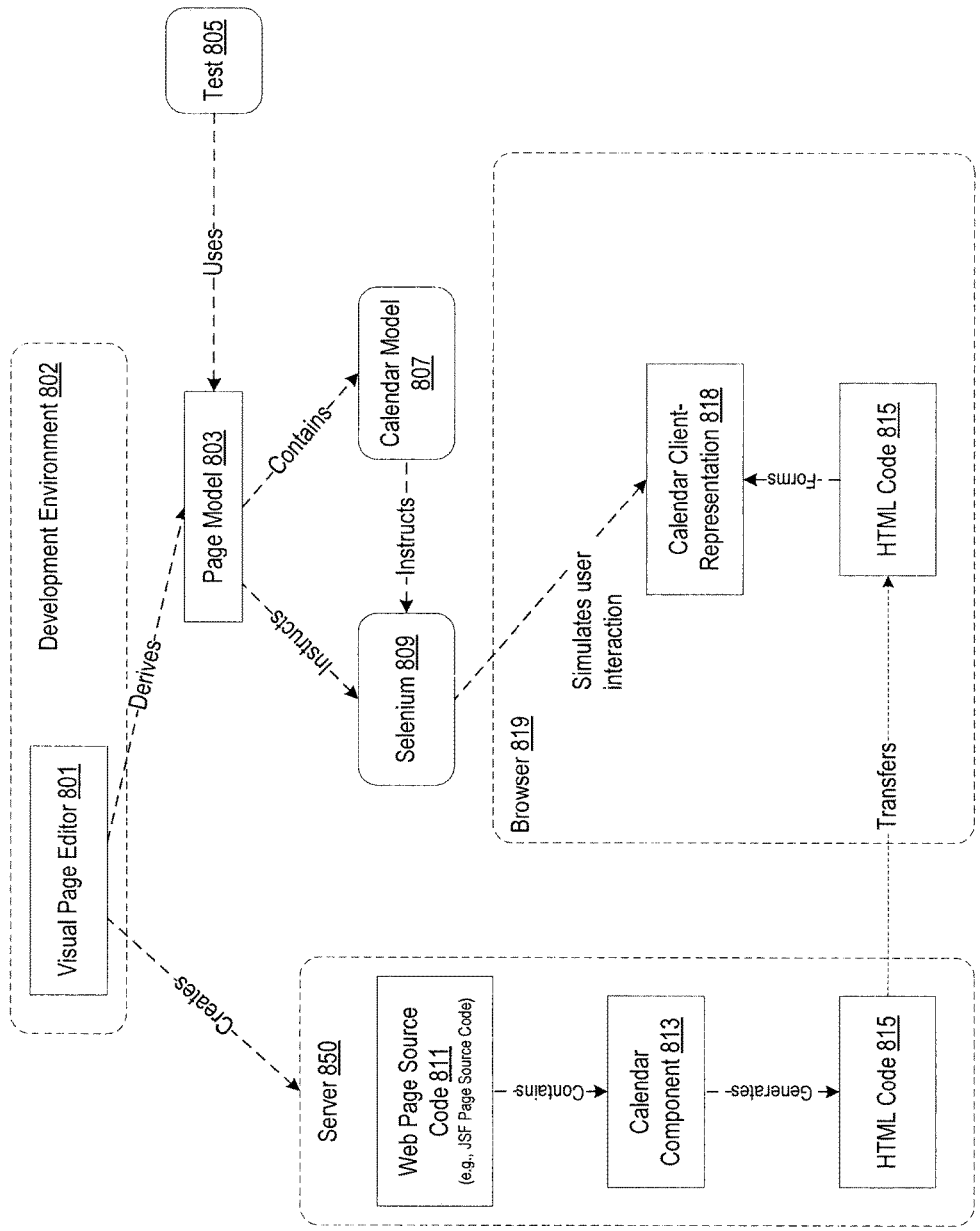
FIG. 8 is a block diagram of an exemplary use of a page model and a component model to test a web page.

FIG. 8 is a block diagram of an exemplary use of a page model and a component model to test a web page. An editor tool, such as visual page editor 801, creates intermediary web page source code 811 (e.g., JSF page source code) and provides it to a server 850. The JSF page source code 811 includes code for one or more calendar components 813. The server 850 generates client-side HTML code 815 to represent the web page and provides the client-side HTML code 815 to a browser 819 hosted, for example, by a test server (e.g., test server 160 in FIG. 1). The visual page editor 801 in a development environment 802 derives a page model 803 for the web page from the component identifiers in the JSF page source code 811. A test 805 for testing the web page is created by a test developer using the page model 803. The page model 803 contains a calendar model 807 for testing the calendar components in the web page. The page model 803 and calendar model 807 instruct the Selenium testing tool 809 to test the web page. The Selenium testing tool 809 simulates user interaction of the client-side representation 818 of the calendar component 813.

Figure 9:
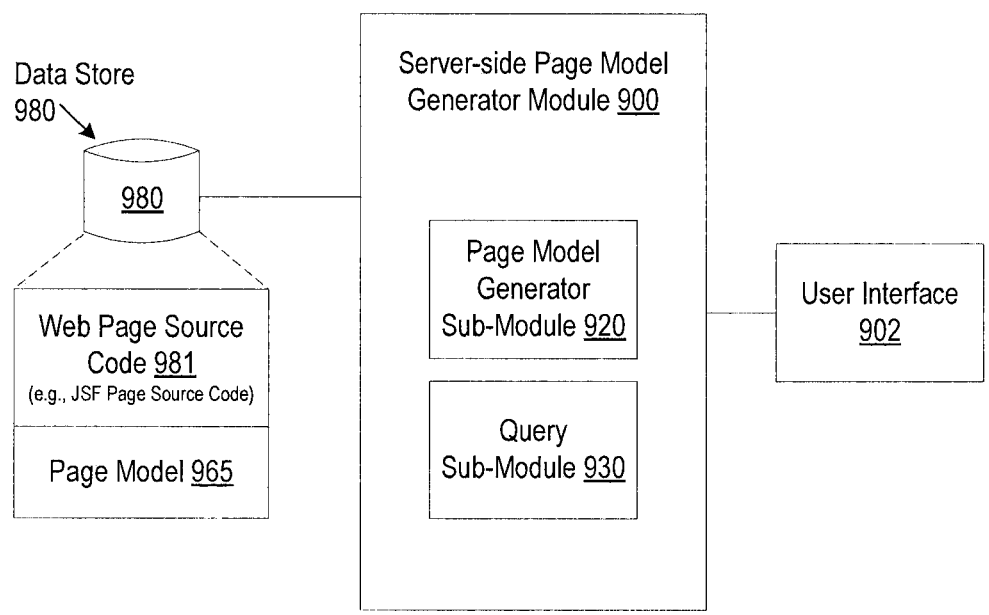
FIG. 9 is a block diagram of one embodiment of a server-side page model generator module.

FIG. 9 is a block diagram of one embodiment of a server-side page model generator module 900 for providing a page model at application run-time. The server-side page model generator module 900 can be the same as the server-side page model generator module 109 hosted by a server 170 of FIG. 1. The server-side page model generator module 900 can include a page model generator sub-module 920 and a query sub-module 930.

A web application developer can write the source code for a web application using server-side string based identifiers for the components, according to one embodiment. An example of a server-side string based identifier is an annotation symbol with a string. For example, a server-side string based identifier for a calendar component may be "@calendar". A test developer can write tests using the same server-side string based identifier (e.g., @calendar). In another embodiment, the binding is not string-based. In one embodiment, the binding uses type-safe identifiers. In one embodiment, type-safe identifiers are annotations. For example, type-safe identifiers can be annotations that are used in a Java programming language.

At application run-time, the page model generator sub-module 920 creates a page model 965 of a web page of the web. A web application test developer can query the page model generator sub-module 920 for a client-side identifier that corresponds to the server-side string based identifier of a component which the test developer wishes to test. The query can include the server-side string based identifier (e.g., @calendar), which the query sub-module 930 can use to process the query. For instance, the test tool is to test a calendar component and the query includes "@calendar." The query sub-module 930 can receive the query and can use "@calendar" to search the intermediary web page source code 981 (e.g., JSF page source code) that is stored in a data store 980 for a match. The query sub-module 930 can locate a match to the server-side string based identifier for the calendar (e.g., @calendar) and use an algorithm to generate the client-side identifier for the component. The query sub-module 930 can provide the client-side identifier as a query result to the test tool. The client-side identifier can be used by a test tool as a selector to point to the components in a web page.

Figure 10:
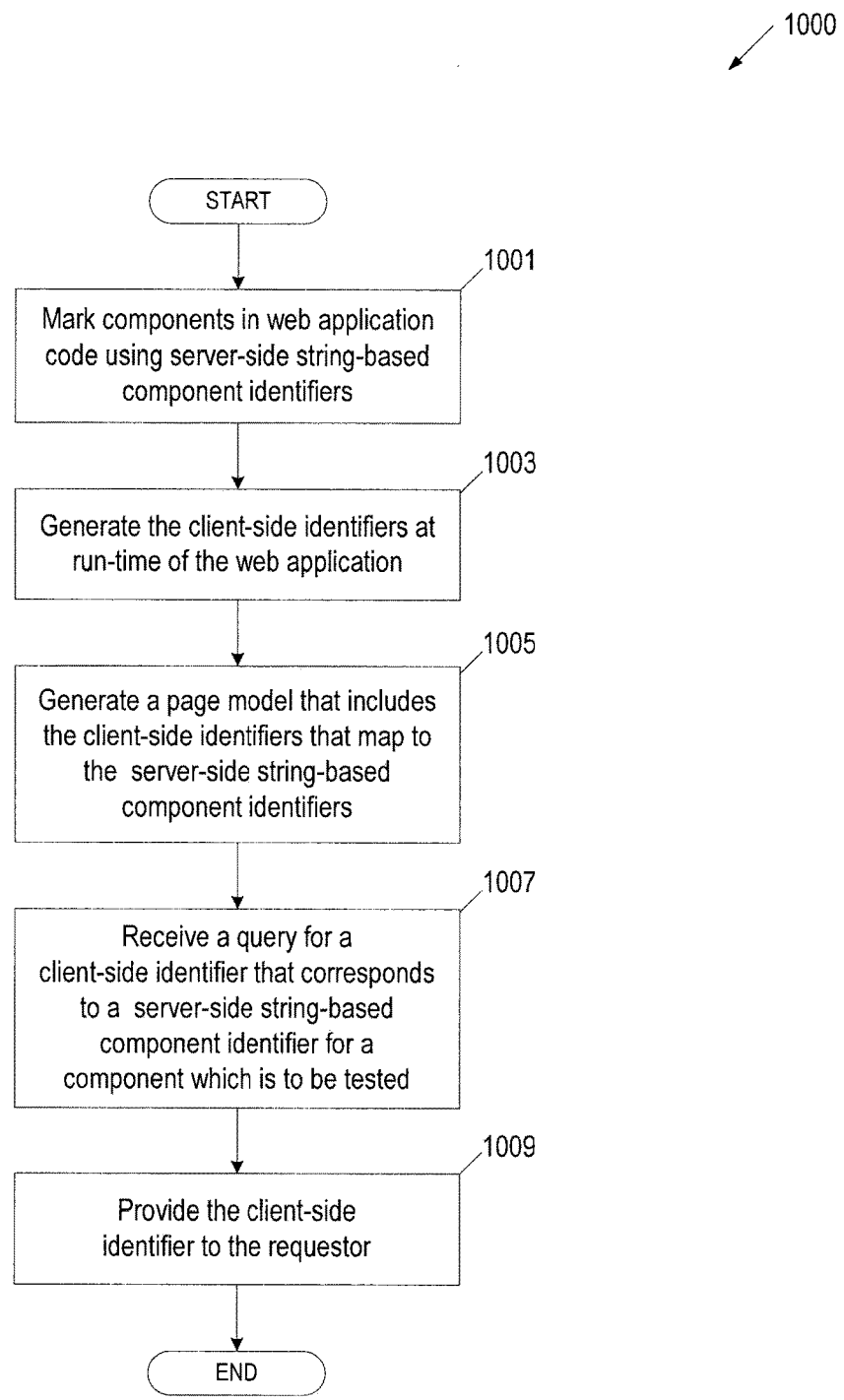
FIG. 10 is a flow diagram of an embodiment of a method for generating a page model for a web page at run-time of a web application.

FIG. 10 is a flow diagram of an embodiment of a method 1000 for generating a page model for a web page at run-time of a web application. Method 1000 can be performed by processing logic that can comprise hardware (e.g., circuitry, dedicated logic, programmable logic, microcode, etc.), software (e.g., instructions run on a processing device), or a combination thereof. In one embodiment, method 1000 is performed by the server-side page model generator module 109 hosted by a web application server 170 of FIG. 1.

At block 1001, the server-side page model generator module marks component identifiers in application code for a web application using server-side string-based component identifiers, according to one embodiment. In another embodiment, the binding is not string-based. In one embodiment, the binding uses type-safe identifiers. An example of a server-side string-based component identifier is an annotation symbol "@" and a string. For instance, the component is a calendar component and the server-side page model generator module marks instances of the component identifiers in the application code relating to the calendar using "@calendar." In one embodiment, type-safe identifiers are annotations (e.g., annotations hat are used in a Java programming language). At block 1003, at application run-time, the server-side page model generator module uses an algorithm to derive client-side identifiers from the component identifiers in an intermediary page for the web application, such as a JSF page. At block 1005, the server-side page model generator creates a page model that includes the selectors that point to the components in a web page. The selectors can be the client-side identifiers that are generated at application run-time. The page model can include a mapping of the client-side identifiers to the server-side string-based component identifiers. The server-side page model generator module can store the page model.

At block 1007, the server-side page model generator module receives a query to provide a selector (e.g., client-side identifier generated at run-time) that corresponds to a server-side string-based component identifier of a component which is to be tested by a test tool. The query can include the server-side string-based component identifier, which the web application test model module can use to process the query. The server-side page model generator module can use the server-side string-based component identifier from the query (e.g., @calendar) to search the mapping data in the page model for the corresponding client-side identifier. At block 1009, the server-side page model generator module provides the client-side identifier that corresponds to the server-side string-based component identifier that was included in the query to the requestor. The server-side page model generator module can provide the client-side identifier as a query result, for example, to the test tool.

Figure 11:
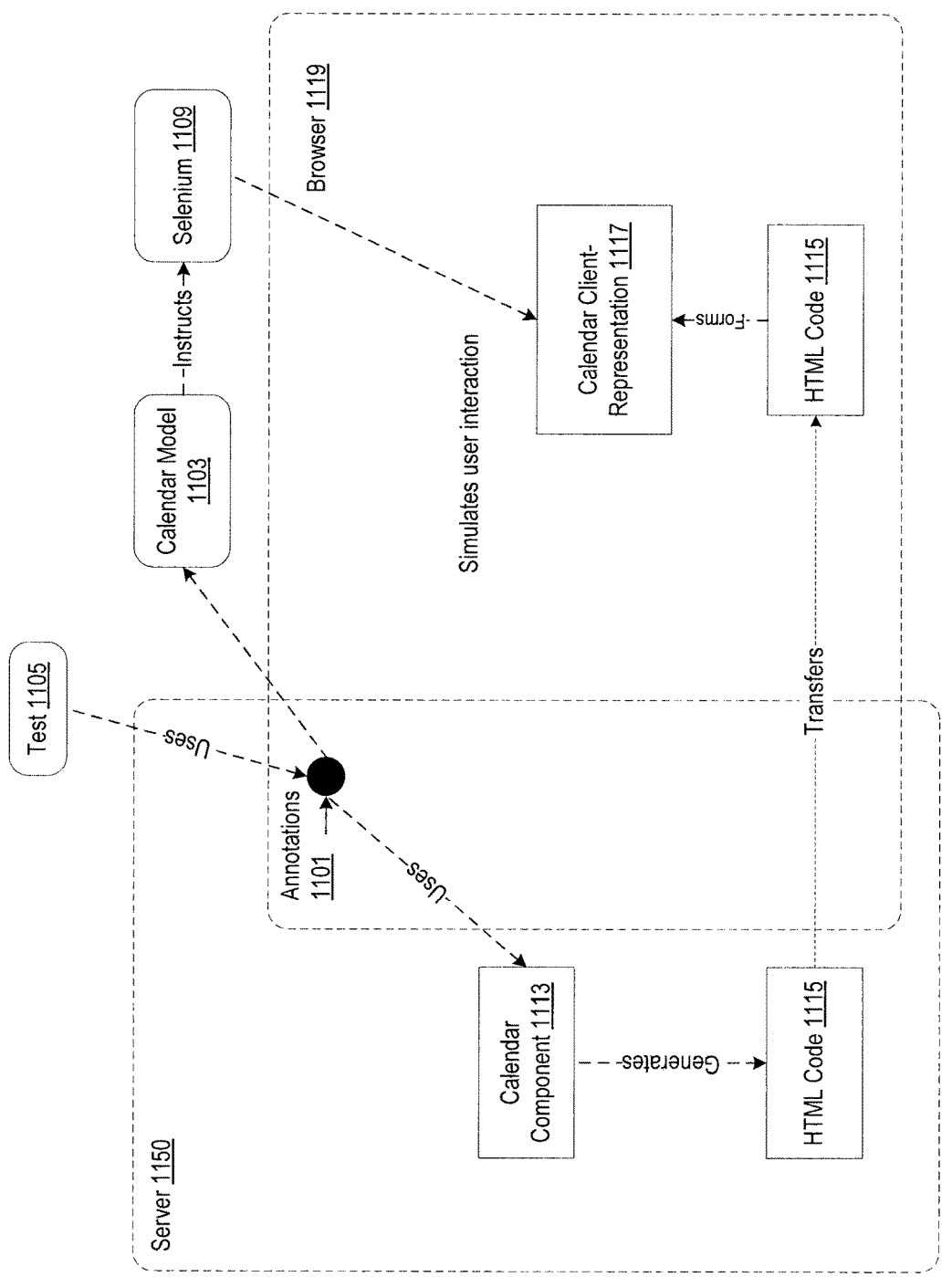
FIG. 11 is a block diagram of an exemplary use of annotations to test a web page.

FIG. 11 is a block diagram of an exemplary use of annotations 1101 that are inspected at application run-time for querying locators and a component model 1103 (e.g., calendar model) to test a web page. A web application developer writes a web application hosted by a web application server 1150 using one or more annotations 1101. The annotations 1101 exists as part of application source code. The web application includes one or more calendar components 1113. The server 1150 generates client-side HTML code 1115 to represent the web page and provides the client-side HTML code 1115 to a browser 1119 hosted by a client. The server 1150 inspects annotations 1101 for the calendar components 1113 at application run-time. One or more tests 1105 are written using the annotations 1101 used in the web application. The tests 1105 use the annotations 1101 to demark the component model, such as a calendar model 1107, that corresponds to an annotation 1101 as used by a test 1105. The calendar model 1107 instructs the Selenium testing tool 1109 to test the web page. The Selenium testing tool 1109 simulates user interaction of the client-side representation of the calendar component 1117.

Figure 12:
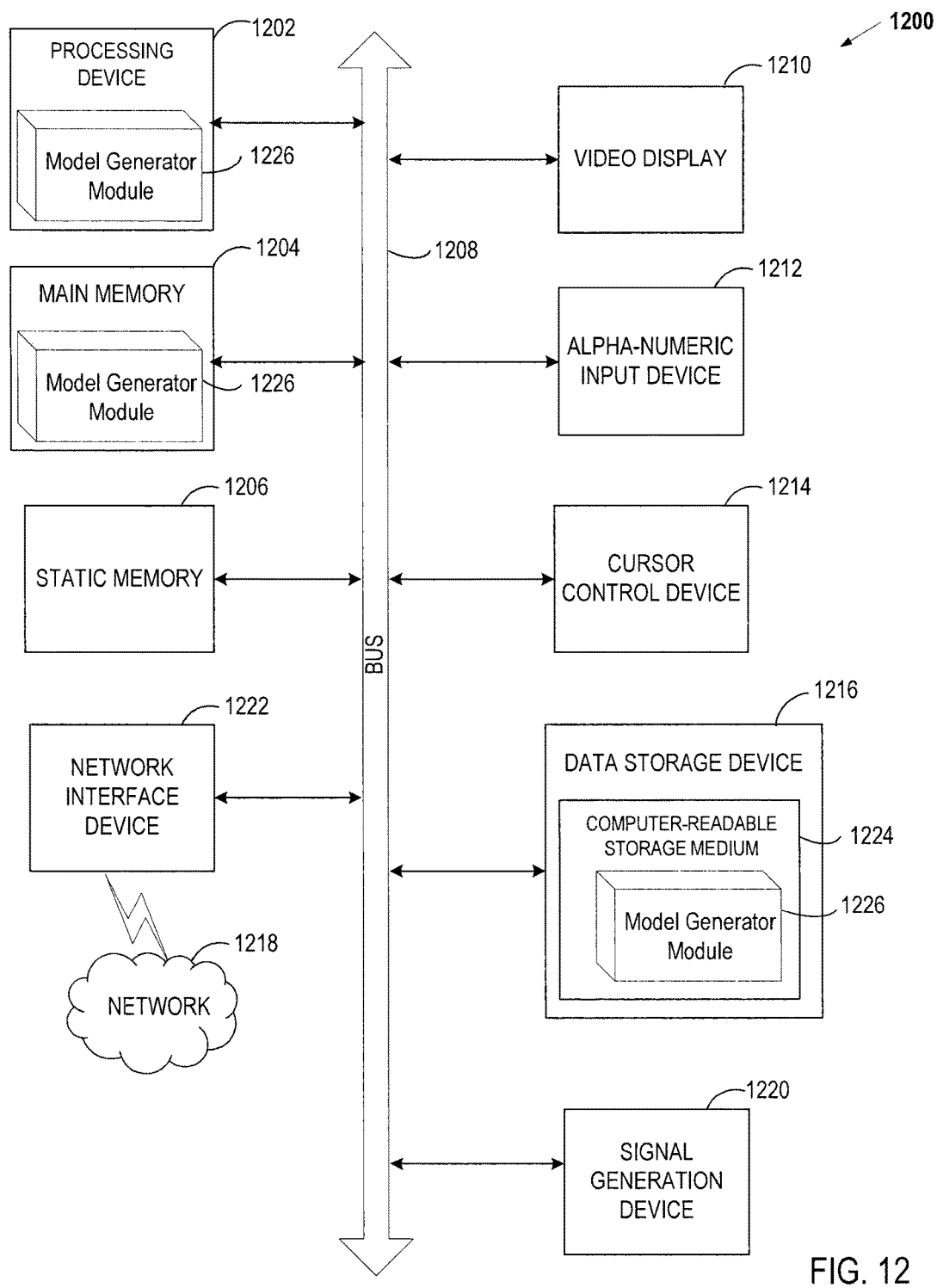
FIG. 12 is a diagram of one embodiment of a computer system for generating a test model.

FIG. 12 is a diagram of one embodiment of a computer system for providing a model (e.g., a component model, a page model) for testing a web application. Within the computer system 1200 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a secondary memory 1216 (e.g., a data storage device in the form of a drive unit, which may include fixed or removable computer-readable storage medium), which communicate with each other via a bus 1208.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1202 is configured to execute the test model module 1226 (e.g., server-side page model generator module 109, client-side page model generator module 114, and/or component model generator module 110 in FIG. 1) for performing the operations and steps discussed herein.

The computer system 1200 may further include a network interface device 1222. The computer system 1200 also may include a video display unit 1210 (e.g., a liquid crystal display (LCD) or a cathode ray tube (CRT)) connected to the computer system through a graphics port and graphics chipset, an alphanumeric input device 1212 (e.g., a keyboard), a cursor control device 1214 (e.g., a mouse), and a signal generation device 1220 (e.g., a speaker).

The secondary memory 1216 may include a machine-readable storage medium (or more specifically a computer-readable storage medium) 1224 on which is stored one or more sets of instructions (e.g., the test model module 1226) embodying any one or more of the methodologies or functions described herein. The test model module 1226 may also reside, completely or at least partially, within the main memory 1204 and/or within the processing device 1202 during execution thereof by the computer system 1200, the main memory 1204 and the processing device 1202 also constituting machine-readable storage media. The test model module 1226 may further be transmitted or received over a network 1218 via the network interface device 1222.

The computer-readable storage medium 1224 may also be used to store the test model module 1226 persistently. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The test model module 1226, components and other features described herein (for example in relation to FIGS. 3, 6, and 9) can be implemented as discrete hardware components or integrated in the functionality of hardware components such as ASICS, FPGAs, DSPs or similar devices. In addition, the test model module 1226 can be implemented as firmware or functional circuitry within hardware devices. Further, the test model module 1226 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "providing," "releasing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing a test model for testing a web page is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving first user input indicative of a root location of an element of a visual web application framework component having a hypertext markup language (HTML) tree structure, wherein the visual web application framework component comprises a plurality of visual user interface (UI) elements, and wherein the HTML tree structure comprises a respective root location for each element of the plurality of visual UI elements of the web application framework component;
   receiving second user input indicative of one or more respective paths from the root location of the element of the visual web application framework component to one or more sub-elements of the element of the visual web application framework component;
   generating, by a processing device, a component model for the element of the visual web application framework component comprising data indicating the root location of the element of the visual web application framework component and data indicating the one or more respective paths from the root location of the element to the one or more sub-elements;
   generating a page model for a web page comprising the element of the visual web application framework component at run-time of the element of the visual web application framework component of the web page, wherein the page model is generated using annotations; and
   providing the page model and the component model to a test tool to enable the test tool to test the web page and the visual web application component.

2. The method of claim 1, wherein the page model is generated in view of identifiers from an editor tool that creates the web page.

3. The method of claim 1, further comprising:
   receiving a query for a client-side identifier that corresponds to an annotation; and
   providing the client-side identifier that satisfies the query to a requestor.

4. The method of claim 1, wherein providing the component model comprises:
   releasing a version of the component model with a release of a corresponding version of a framework tool for the visual web application framework component.

5. A system comprising:
   a memory; and
   a processing device operatively coupled to the memory, the processing device to:
   receive first user input indicative of a root location of an element of a visual web application framework component having a hypertext markup language (HTML) tree structure, wherein the visual web application framework component comprises a plurality of visual user interface (UI) elements, and wherein the HTML tree structure comprises a respective root location for each element of the plurality of visual UI elements of the web application framework component;
   receive second user input indicative of one or more respective paths from the root location of the element of the visual web application framework component to one or more sub-elements of the element of the visual web application framework component;
   generate a component model for the element of the visual web application framework component comprising data indicating the root location of the element of the visual web application framework component and data indicating the one or more respective paths from the root location of the element to the one or more sub-elements;
   generate a page model for a web page comprising the element of the visual web application framework component at run-time of the element of the visual web application framework component of the web page, wherein the page model is generated using annotations; and
   provide the page model and the component model to a test tool to enable the test tool to test the web page and the visual web application component.

6. The system of claim 5, wherein the page model is generated in view of identifiers from an editor tool that creates the web page.

7. The system of claim 5, wherein to generate the page model the processing device is to:
   receive a query for a client-side identifier that corresponds to an annotation; and
   provide the client-side identifier that satisfies the query to a requestor.

8. The system of claim 5, wherein to provide the component model the processing device is to:
   release a version of the component model with a release of a corresponding version of a framework tool for the visual web application framework component.

9. A non-transitory computer-readable medium including instructions that, when executed by a processing device, cause the processing device to:
   receive first user input indicative of a root location of an element of a visual web application framework component having a hypertext markup language (HTML) tree structure, wherein the visual web application framework component comprises a plurality of visual user interface (UI) elements, and wherein the HTML tree structure comprises a respective root location for each element of the plurality of visual UI elements of the web application framework component;

receive second user input indicative of one or more respective paths from the root location of the element of the visual web application framework component to one or more sub-elements of the element of the visual web application framework component;

generate a component model for the element of the visual web application framework component comprising data indicating the root location of the element of the visual web application framework component and data indicating the one or more respective paths from the root location of the element to the one or more sub-elements;

generate a page model for a web page comprising the element of the visual web application framework component at run-time of the element of the visual web application framework component of the web page, wherein the page model is generated using annotations; and provide the page model and the component model to a test tool to enable the test tool to test the web page and the visual web application component.

10. The non-transitory computer-readable medium of claim 9, wherein the page model is generated in view of identifiers from an editor tool that creates the web page.

11. The non-transitory computer-readable medium of claim 9, wherein to generate the page model, the processing device is to:

receive a query for a client-side identifier that corresponds to an annotation; and provide the client-side identifier that satisfies the query to a requestor.

12. The non-transitory computer-readable medium of claim 9, wherein to provide the component model, the processing device is to:

release a version of the component model with a release of a corresponding version of a framework tool for the visual web application framework component.

* * * * *